United States Patent [19]

Allen

[11] 4,305,380

[45] Dec. 15, 1981

[54] SOLAR ENERGY SYSTEM AND SOLAR POWERED TRACKING APPARATUS THEREFOR

[76] Inventor: Robert W. Allen, 15916 Los Altos, Fountain Valley, Calif. 92708

[21] Appl. No.: 126,850

[22] Filed: Mar. 3, 1980

[51] Int. Cl.³ .................... F24J 3/02; G03B 21/00; G01J 1/20
[52] U.S. Cl. ........................... 126/425; 353/3; 250/203 R; 126/424
[58] Field of Search ............ 126/419, 424, 425, 433; 353/3; 250/203 R

[56] References Cited

U.S. PATENT DOCUMENTS

| | | | |
|---|---|---|---|
| 4,172,739 | 10/1979 | Tassen | 353/3 |
| 4,175,391 | 11/1979 | Baer | 126/424 |
| 4,185,615 | 1/1980 | Bottum | 126/424 |
| 4,198,954 | 4/1980 | Meijer | 353/3 |

FOREIGN PATENT DOCUMENTS

1493  4/1979  European Pat. Off. ............. 126/425

*Primary Examiner*—Samuel Scott
*Assistant Examiner*—G. Anderson
*Attorney, Agent, or Firm*—Larson and Taylor

[57] ABSTRACT

Solar tracking apparatus for a solar energy system comprises at least one chamber containing a volatile fluid, a shading arrangement for controlling the degree to which the at least one chamber is exposed to the sun in dependence on the position of the sun so as to control the extent to which the fluid is vaporized due to solar heating of the at least one chamber, and apparatus for coupling the expansive force generated by vaporization of the fluid to a work piece to control the position, orientation, and/or operation thereof. Preferably, the solar tracking apparatus comprises a base pivotably mounted with respect to a pivot axis, first and second chambers mounted to the base in counterbalancing relationship with respct to the pivot axis, a conduit connecting the chambers for transfer to fluid therebetween, a volatile fluid disposed in the chambers for transfer therebetween, and a shading arrangement for controlling the degree to which each of the chambers is exposed to the sun such that a differential vapor pressure is created therebetween in dependence on the position of the sun which causes a predetermined transfer of the fluid between the chambers so as to change the proportion of the fluid disposed within each of the chambers and thereby cause the base to pivot into a predetermined orientation with respect to the position of the sun.

8 Claims, 18 Drawing Figures

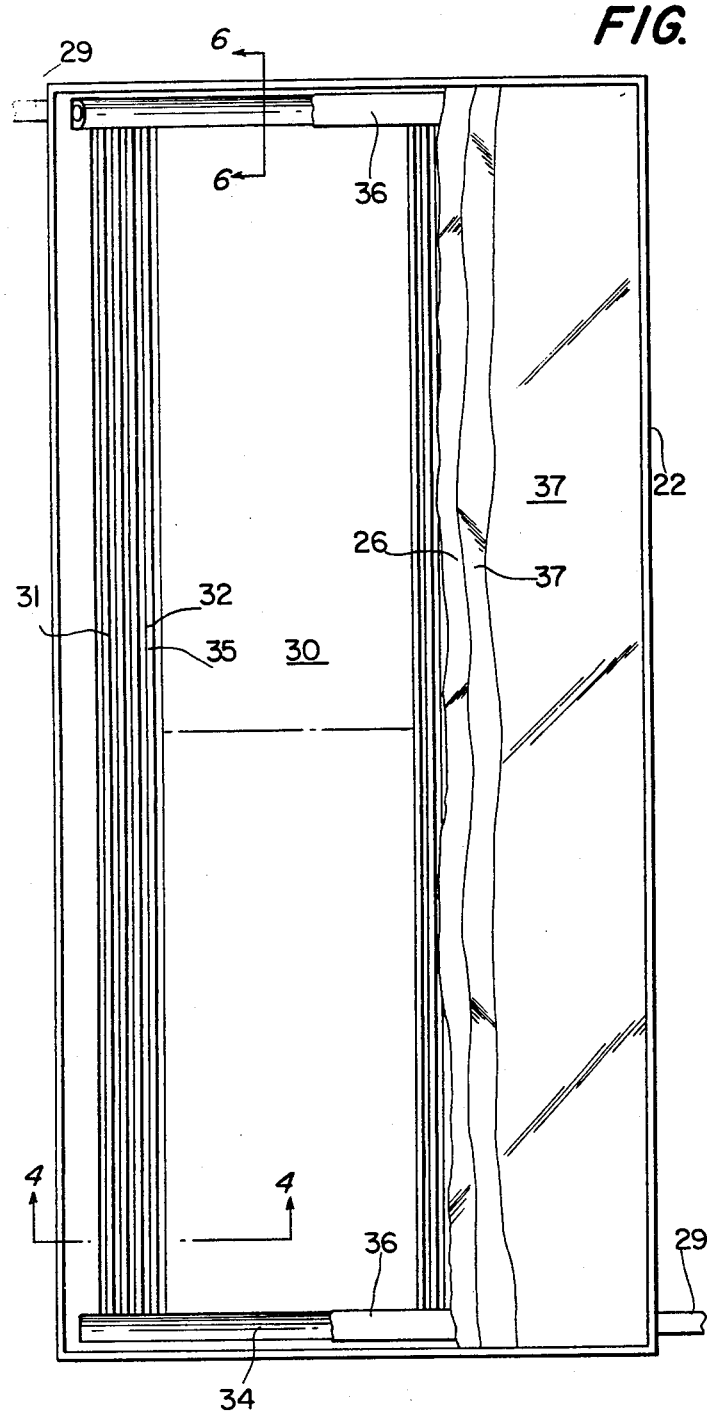
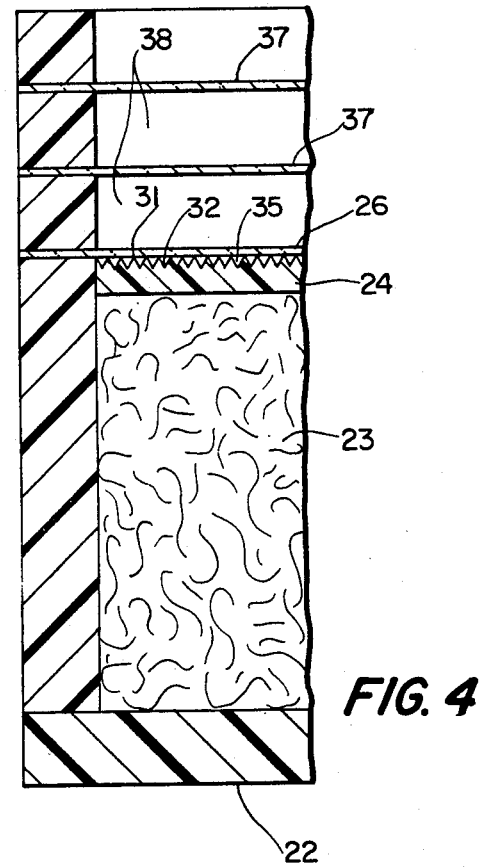
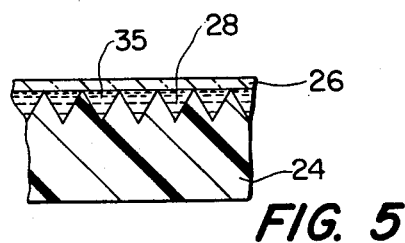
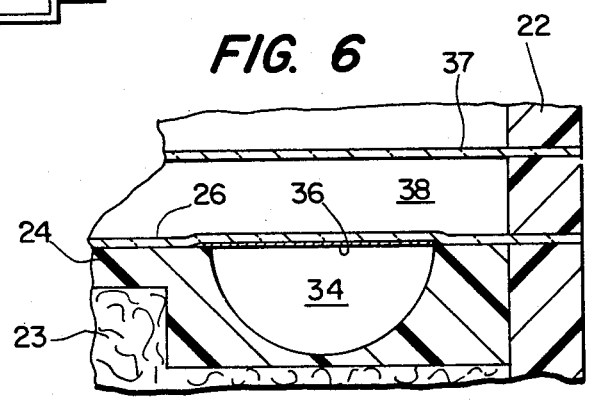
FIG. 3
FIG. 4
FIG. 5
FIG. 6

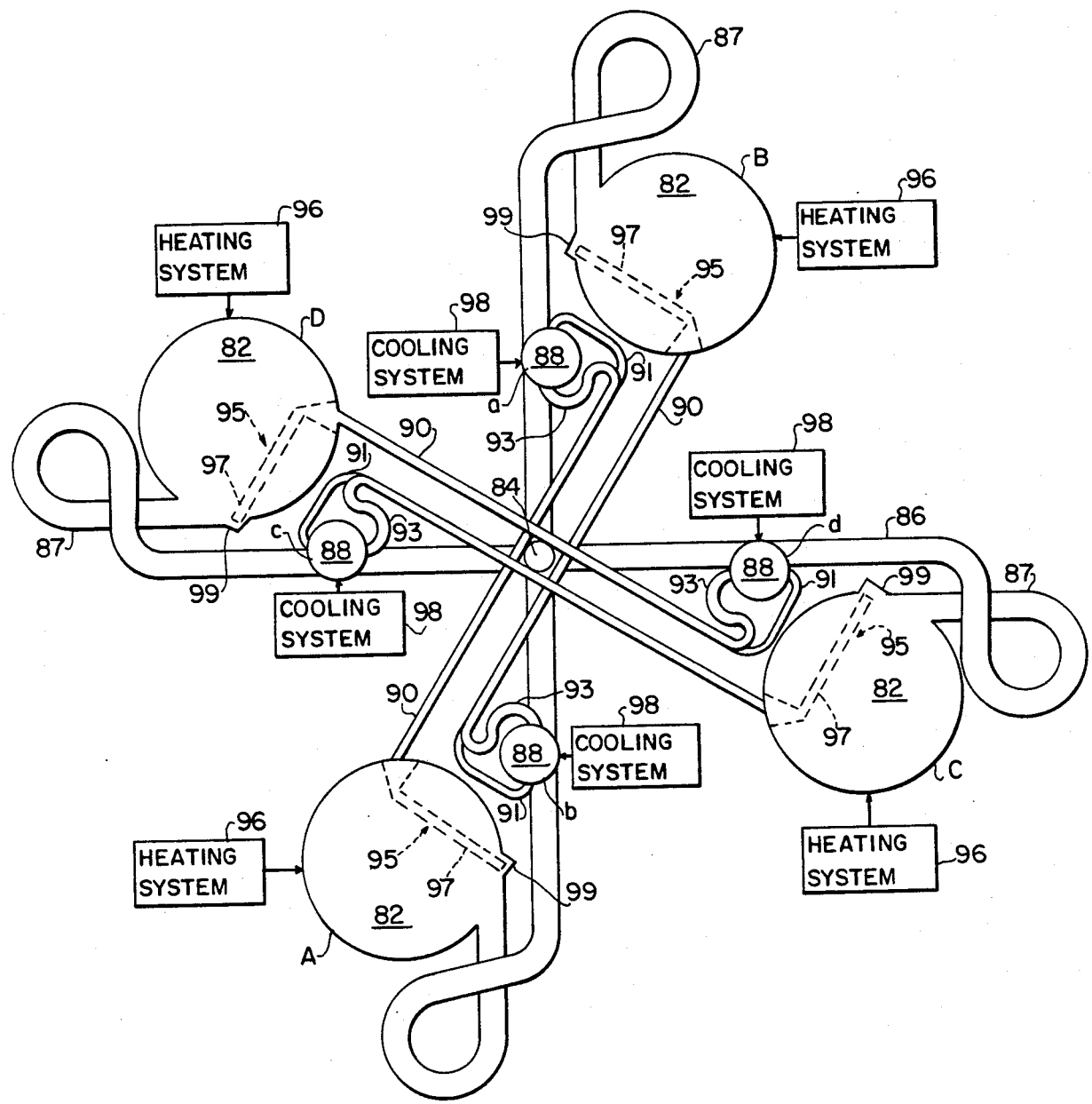

SOLAR ENERGY SYSTEM AND SOLAR POWERED TRACKING APPARATUS THEREFOR

FIELD OF THE INVENTION

The present invention relates in general to solar energy systems, and in particular to systems comprising solar heat collectors mounted on solar trackers and heat engines adapted to operate with heat energy supplied by solar collectors.

BACKGROUND OF THE INVENTION

Although fossil fuels are currently the world's major source of energy, the increasing cost of fossil fuels and the increasing uncertainty regarding the availability of oil, the most readily used form of fossil fuels, have generated an ever increasing demand for alternative forms of energy. Concern over the environmental impact of coal and nuclear energy, as well as concern over the safety of nuclear energy has led to a growing interest in solar energy.

The approaches to harnessing solar energy have been many and varied. Of most pertinence to the present invention are thermal approaches utilizing solar heat collectors and thermodynamic motors or heat engines.

Typically, conventional solar heat collectors basically comprise a heat transfer fluid, commonly water, and some form of solar absorber apparatus for converting solar radiation to heat radiation, although in some solar heat collectors the heat transfer fluid also functions to convert the solar radiation to heat radiation. Examples of the former type of collector are disclosed in U.S. Pat. Nos. 3,215,134 (Thomason); 3,965,887 (Gramer et al); 4,030,478 (Beaver, Jr.); 4,038,967 (Stout et al); 4,067,316 (Brin et al); 4,086,912 (Freeman); and 4,106,482 (Savage et al). Examples of the latter type of collector are disclosed in U.S. Pat. Nos. 4,062,351 (Hastwell); 4,134,389 (McClintock); and 4,158,355 (Spitzer). Of the collectors which segregate the heat collecting and heat transfer functions, several shield the heat transfer medium from exposure to the sun. The collectors disclosed in the Gramer et al, Stout et al, Brin et al, and Savage et al patents are of this type. The efficiency of such collectors is limited because there is nothing to usefully absorb the heat which is radiated from the collector back toward the sun and away from the heat transfer medium.

Several specific features have been incorporated into conventional solar heat collectors in order to improve the efficiency thereof. As exemplified by the Thomason collector, the heat collector surface has been configured in an irregular, nonplanar shape to provide for channelization of the heat transfer liquid so as to minimize the volume-to-surface ratio thereof. An irregular configuration has also been employed wherein a plurality of angularly disposed planar surfaces are provided which allow the solar angles of incidence either to be decreased or to be increased to cause any reflection of solar radiation from the collector surface which occurs to be back onto the collector surface rather than back to the atmosphere. However, the efficiency of such collectors is reduced because a uniform fluid flow over the entire heat absorbing surface has heretofore not been obtained.

A further feature of conventional solar collectors is the provision of a relatively transparent sheet, which may be in the form of a flexible membrane, overlying or covering the absorber surface. One common function of such a sheet is to reduce uncontrolled reradiation and convection currents. Another common function is to decrease the undesired effects of vaporization of the heat transfer fluid. However, conventional collectors having such covering sheets lose efficiency through absorption of solar energy in those sheets which are thick enough to withstand the pressures created within the collectors when the heat transfer fluid is pumped therethrough at an accelerated rate, or through the inability of those sheets which are flexible to contain the heat transfer fluid properly when a flow rate greater than a trickle is desired or when those collectors utilizing a minimal flow rate are tilted at steep angles. Another disadvantage heretofore of using covering sheets with collectors having channelized fluid flow has been the necessity of mechanically sealing the covering sheets to irregularly configured collector surfaces in order to adequately contain and control the flow.

Another approach to improving the efficiency of conventional solar collectors is disclosed in the Gramer et al patent. Thermal transfer is improved between the solar absorber and the heat transfer liquid by providing rectangular fluid passages having specified dimensions, and by accelerating the heat transfer fluid flow through the passages to maintain a laminar flow of substantially constant cross-sectional area, so as to minimize eddy currents.

Yet another approach to improving the efficiency of conventional solar collectors has been to provide tracking apparatus for maintaining the collector in a predetermined orientation with respect to the sun during the transit thereof through the sky. Examples of such trackers are disclosed in U.S. Pat. Nos. 1,938,003 (Arthuys et al); 4,044,752 (Barak); and 4,147,154 (Lewandowski).

However, despite these and other features, conventional solar heat collectors have not achieved sufficiently high operating efficiencies to justify the costs of manufacture, installation, and operation for widespread use.

With regard to conventional heat engines, such devices have employed either a single volatile fluid or a volatile fluid which is mechanically coupled to a dense fluid. Examples of single-fluid heat engines are disclosed in U.S. Pat. Nos. 243,909 (Iske et al); and 3,983,704 (McFarland); and in an article entitled "Wally Minto's Wonder Wheel," appearing in the March 1976 issue of *Popular Science* at page 79. Examples of two-fluid heat engines are disclosed in U.S. Pat. Nos. 3,984,985 (Lapeyre); and 4,074,534 (Morgan). However, both types of heat engines have exceedingly low operating efficiencies and have never proved commercially feasible.

SUMMARY OF THE INVENTION

These and other disadvantages of the prior art are overcome by a solar energy system constructed in accordance with the present invention, which comprises an improved solar heat collector and heat engine which are low in cost, easy to manufacture, and which provide superior operating efficiencies; and an improved solar tracker of exceedingly simple construction and effectiveness.

In accordance with one aspect of the present invention, the solar heat collector is provided with a heat transfer fluid, such as mineral oil, an aliphatic hydrocarbon oil or a silicone oil, which is substantially transparent to shortwave infrared (IR) solar radiation and has a low reradiation factor for longwave IR heat, and which is disposed in overlying contact with the radiation receiving surface of a solar absorber.

In accordance with another aspect of the present invention, the solar heat collector is configured so as to define at least one passage for flow of heat transfer fluid in contact with a solar absorber and is provided with apparatus for creating a relative vacuum in the at least one channel so as to minimize the creation of a stagnant boundary layer of the heat transfer fluid in contact with the solar absorber when the heat transfer fluid is pumped through the at least one passage.

In accordance with still another aspect of the present invention, the solar absorber has a convoluted surface defining at least one groove, and a sheet, which is preferably flexible, sealingly engages the convoluted surface through the action of a vacuum such that the sheet and the at least one groove form a corresponding at least one passage for the flow of heat transfer fluid therethrough. Advantageously, the convoluted surface is the radiation receiving surface of the absorber, and the sheet is substantially transparent to solar IR radiation.

In accordance with a further aspect of the invention, solar tracking apparatus constructed in accordance with the present invention comprises at least one chamber containing a volatile fluid, shading for controlling the degree to which each chamber is exposed to the sun in dependence on the position of the sun so as to control the extent to which the fluid is vaporized due to solar heating, and coupling apparatus for coupling the expansive force generated by vaporization of the fluid to a workpiece to control the position, orientation, and/or operation thereof.

Preferably, solar apparatus constructed in accordance with the present invention comprises a base pivotably mounted with respect to a pivot axis, first and second chambers mounted to the base in counterbalancing relationship with respect to the pivot axis, a conduit connected between the chambers for transfer of fluid therebetween, a volatile fluid disposed in the chambers, and shading for controlling the degree to which each chamber is exposed to the sun such that a differential vapor pressure is created between the chambers in dependence on the position of the sun which causes a predetermined transfer of fluid between the chambers. The transfer of fluid in turn causes the base to pivot into a predetermined orientation with respect to the position of the sun.

Advantageously, mounting apparatus is provided which produces a counterbalancing biasing force when the base is pivoted at an inclined angle with respect to a predetermined position.

In accordance with a still further aspect of the present invention, a heat engine constructed in accordance with the present invention comprises first and second tanks radially mounted for rotation with respect to an axis of rotation and so as to be spaced from each other, a conduit connecting the tanks together for transfer of fluid therebetween, a heated, relatively heavy fluid disposed in the tanks for transfer therebetween, and apparatus for introducing a relatively volatile fluid in a condensed state into direct vaporizing contact with the heavy fluid at predetermined times during the rotation of the tanks such that expansion of the vaporized volatile fluid causes heavy fluid to be cyclically transferred between the tanks so as to maintain rotation thereof.

Advantageously, the tanks are diammetrically opposed to each other, and the volatile fluid introducing apparatus comprises apparatus for condensing first and second portions of the volatile fluid, and a conduit connecting each condensing apparatus to the corresponding tank for transfer of the volatile fluid portions to the respective tanks when the tanks are at least substantially at the lowermost positions thereof.

A solar energy system constructed in accordance with the present invention provides superior operating efficiencies far exceeding those of conventional systems with apparatus which is exceptionally simple and inexpensive to manufacture, easy to operate, and extremely reliable.

In particular, the performance of the solar collector of the present invention far exceeds that of conventional flat collector panels. An experimental prototype mounted in a fixed orientation at a Los Angeles, Calif. site has been producing a thermal output which is almost twice that predicted for optimal solar panel performance in the Los Angeles area by the Dow-Corning Corporation in its *The Solar Decision Book*, published in 1978, and which is over twice the average output of the collectors tested by the Southern California Gas Company in 1979.

The solar tracker of the present invention also offers superior performance. Operating with the sun itself as its only source of power, and without the need for exotic heat or light sensitive materials, as is the case with conventional solar-powered trackers, an experimental prototype of applicant's solar tracker has improved the performance of the aforementioned prototype of applicant's solar collector over 225%, as compared with the output obtainable when the collector is maintained in a fixed orientation.

Similarly, the heat engine of the present invention is capable of operating efficiencies at least equal to those of commercial power generating steam turbines, and is particularly adapted to operate with heat energy obtained from the sun.

Other features and advantages of the invention will be set forth in, or apparent form, the detailed description of preferred embodiments found hereinbelow.

BRIEF DESCRIPTION OF THE DRAWINGS

In the figures, like elements have been designated with like reference numerals. In addition, for the sake of clarity, various features have been omitted and/or only certain features have been shown in phantom in particular views.

FIG. 3 is a top plan view, partially broken away, of a portion of the solar collector illustrated in FIG. 2.

FIG. 4 is a cross-sectional view taken generally along the line 4—4 and partially broken away of the solar collector apparatus shown in FIG. 3.

FIG. 5 is an enlarged detail view of a portion of FIG. 4.

FIG. 6 is a cross-sectional view, taken generally along line 6—6 and partially broken away, of the solar collector of FIG. 3.

FIG. 17 is a diagrammatic side elevation view of a heat engine constructed in accordance with the present invention.

DETAILED DESCRIPTION OF THE PREFERRED EMBODIMENTS

Figure 1:
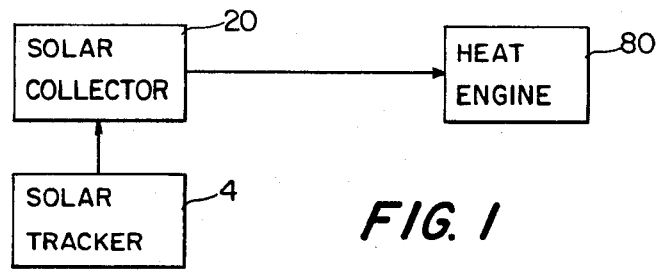
FIG. 1 is a schematic block diagram of a solar energy system constructed in accordance with the present invention.
Figure 2:
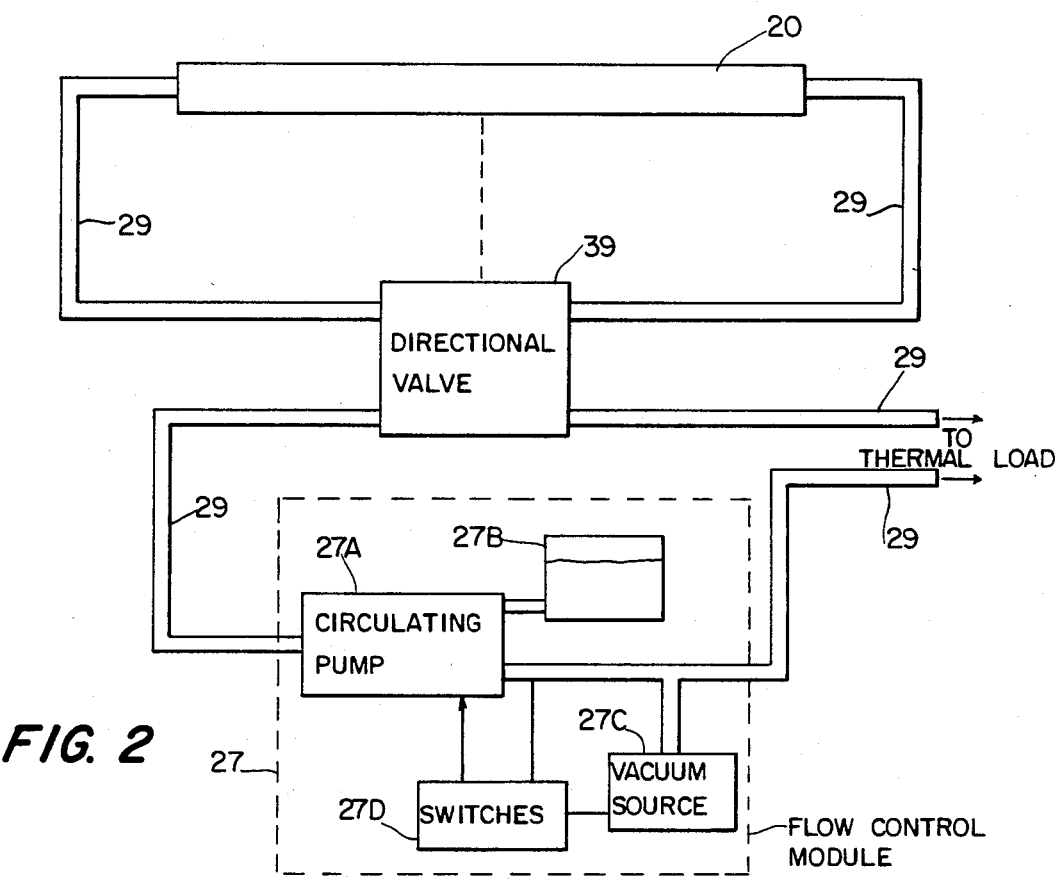
FIG. 2 is a schematic block diagram of a solar collector constructed in accordance with the present invention.

Referring to FIG. 1, a solar energy system constructed in accordance with the present invention generally comprises a solar collector 20 for obtaining heat from solar radiation; a solar tracker 40 for controlling the position, orientation and/or operation of an object, apparatus or the like in dependence on the position of the sun, preferred embodiments of which are particularly adapted to control the orientation of collector 20; and a heat engine 80 for converting heat energy to mechanical or other forms of energy, preferred embodiments of which are particularly adapted to operate with heat energy supplied from collector 20.

Referring to FIGS. 2-6, solar collector 20 generally comprises a frame 22, a solar absorber 24 mounted on frame 22, at least one relatively transparent sheet 26 mounted on frame 22 so as to cover or overlie the surface 30 of absorber 24 which faces the sun, a heat transfer fluid 28 for transferring heat from absorber 24, and a flow control module, generally denoted 27 and connected to frame 22 and a thermal load (not shown) by conduits 29, for creating a vacuum and pumping fluid 28 between absorber 24 and sheet 26.

As shown, frame 22 advantageously is rectangular in shape to maximize the collector surface area, and is made of material such as a plastic or polyester fiberglass to minimize the weight, manufacturing cost and thermal expansion and contraction thereof. Frame 22 is further provided with insulation 23, such as plastic foam, disposed beneath absorber 24 to minimize undesired heat transfer from absorber 24 to other than heat transfer fluid 28.

Absorber 24 is made of any conventional material so as to function as a "black body" and convert the short wave infrared (IR) and, advantageously, other components of solar radiation into heat of long wavelength. Although absorber 24 can be made of a metallic, thermally conductive material with a selective coating, as is conventional, to maximize the thermal efficiency thereof, absorber 24 advantageously comprises a thermally nonconductive material, such as vinylester impregnated with carbon black, which is applied as a coating (not shown) to a substrate made from fiberglass or the like to provide an inexpensive, light-weight, and stable absorber.

As shown, surface 30 of absorber 24 has a convoluted configuration forming a plurality of alternating ridges or teeth 31 and grooves 32. As shown, grooves 32 preferably are identically configured, parallel and of equal lengths to ensure uniformity of fluid flow therethrough. Surface 30 is also formed with transversely extending cylindrical depressions or troughs 34 at each end of grooves 32 which function as distribution manifolds to connect grooves 32 with pump conduits 29 such that heat transfer fluid 28 can be pumped through grooves 32 in either direction. Advantageously, conduits 29 are connected to the corresponding trough 34 at opposite ends thereof, as shown, in order to ensure that the flow of fluid 28 is uniform from groove to groove.

Teeth 31 and grooves 32 preferably are configured so as to provide an optimum solar acceptance angle, and to maximize the surface-to-volume ratio of grooves 32 without sacrificing the flow rate capability thereof. As will be appreciated by those of ordinary skill in the art, the provision of a convoluted surface 30 provides a surface with a greater effective collecting area than a planar surface, which results in collector 20 operating at a lower temperature, and thus with greater efficiency. Further, a convoluted surface 30 increases the thermal transfer efficiency of collector 20 by increasing the percentage of fluid 28 which is in surface contact with absorber 24. A further advantage of maximizing the surface-to-volume ratio of grooves 32 is that the amount of fluid 28 passing through collector 20 at any one time is minimized, thereby reducing the operating weight of collector 20. This advantage is of particular importance in "retrofit" situations.

Preferably, teeth 31 have thin projecting or vertex edges to provide "knife edge" contact with sheet 26 and thus minimize thermal losses resulting from heat transferred to sheet 26 rather than fluid 28. Triangular or saw-tooth shaped teeth 31 and grooves 32 having vertex angles of 60° have proven to be advantageous. Flatter vertex angles are not preferred because (1) the decreased solar acceptance angle makes the orientation of collector 20 with respect to the sun more critical; (2) the flow rate tends to decrease and the flow rates from groove to groove tend to be uneven; (3) the potential for groove blockage by foreign matter is increased; and (4) the structural reinforcement provided by the saw-tooth configuration is diminished. Steeper vertex angles are advantageous in that they provide improved acceptance angles, but they do present greater manufacturing difficulties. Further, vertex angles which are too steep present the same problems noted hereinabove that overly flat vertex angles present.

In an experimental prototype of absorber 24 approximately 8.5 feet (2.6 meters) long and four feet (1.2 meters) wide, a surface 30 having nine grooves 32 per inch (3.54 grooves per centimeter) which are 0.090 inches (0.23 cm) deep and 8 feet (2.4 meters) long has proven to be most satisfactory. Further, an embodiment of troughs 34 which is 1.75 inches (4.44 cm) in diameter has proven advantageous with the experimental prototype of absorber 24 described hereinabove.

Sheet 26 preferably is transparent to shortwave IR radiation, reflective and nonabsorptive to long wave heat losses, heat resistant, stable with respect to ultraviolet (UV) radiation for long life, tear resistant, substantially impermeable, and has a relatively high tensile strength and a low creep coefficient to minimize undesired deformation. Although sheet 26 can be substantially stiff or rigid, additional advantages are obtained when sheet 26 is in the form of a flexible membrane. An embodiment of sheet 26 made of 2 mil (0.05 mm) thick "Tedlar" or "Teflon" fluorocarbon material has proven to be particularly advantageous. "Tedlar" is generally preferred because of its lower cost, but "Teflon" is preferred when collector 20 is operated at temperatures above approximately 250° F. (121° C.).

Frame 22 preferably is gas-tight and sheet 26 is sealingly mounted to frame 22 in overlying relationship with respect to absorber surface 30 such that a relative vacuum may be created between sheet 26 and absorber 24 which causes sheet 26 to engage the vertex edge of each absorber tooth 32 in liquid-tight sealing contact such that sheet 26 and absorber grooves 32 form a plurality of discrete channels or passages 35 for fluid flow. To minimize the effects of differential thermal expansion and contraction, sheet 26 preferably is joined to a plastic or fiberglass embodiment of frame 22 using high temperature acrylic tape or the like and a covering of fiberglass (not shown).

Passages 35 preferably have uniform configurations such that fluid flow through all of the passages is uniform and does not vary from passage to passage. Hence sheet 26 advantageously has sufficient stiffness to minimize sagging, or other deformation or distortion of the sheet portions overlying absorber grooves 32 which would impede, or otherwise affect the uniformity of flow through passages 35. However, sheet 26 preferably also has sufficient flexibility to facilitate sealing engagement of sheet 26 with absorber teeth 31 when sheet 26 is subjected to a vacuum, and sufficient elasticity to accommodate dimensional changes in the collector caused by diurnal temperature changes.

When a membrane embodiment of sheet 26 is employed, sheet 26 advantageously is secured to frame 22 under sufficient tension to minimize surface irregularities therein which would impede or otherwise interfere with uniform fluid flow through passages 35. In addition, collector 20 preferably is further provided with thin, rigid plates 36 which overlie or cover troughs 34 such that the bottom surfaces of plates 36 are substantially coplanar with the vertex edges of teeth 32. Plates 36 support sheet 26 where it spans troughs 34 to minimize any sagging of sheet 26 in the presence of a vacuum which would restrict any of the interfaces between grooves 32 and troughs 34 and thus interfere with uniform fluid flow through all of the passages 35. Plates 36 preferably also are coated in a conventional manner so as to function as heat absorbers. Consequently, troughs 34 and the fluid 28 disposed therein can actively participate in the heat collection process.

As will be appreciated by those of ordinary skill in the art, the utilization of a vacuum in combination with a convoluted collector surface and a flexible covering sheet in the manner described hereinabove allows heat transfer fluid 28 to be pumped across absorber surface 30 in a channelized flow which is uniform over the entire surface and which is at a uniform and accelerated flow rate without the need, in order to control flow, for rigid, thick, energy-absorbing covering sheets, or the need for specialized mechanical sealing arrangements between the covering sheet and the portions of the absorber surface separating the passages. Further, the vacuum creates a pressure differential between the outer or atmospheric-facing side, and the inner or absorber-facing side of sheet 26 which allows fluid 28 to be pumped through passages 35 at an elevated fluid pressure with minimum distortion of sheet 26. Since fluid 28 flows through passages 35 under fluid pressure, fluid 28 is "squeezed" into intimate contact with the entire surface of each groove 32 so as to improve heat transfer from absorber 24 to fluid 28. Still further, the flow rates through passages 35 are maintained uniform for all orientations of collector 20 without the need for special manifold orifices or adjustments in flow rates to accommodate changing tilt angles.

Although collector 20 is operable with a single sheet 26, collector 20 advantageously is provided with at least one additional sheet, and preferably two additional sheets 37, as shown, sealingly mounted on frame 22 overlying sheet 26 and in spaced relationship thereto. Sheets 37 function to provide insulation and to minimize heat convection and radiation by creating regions 38 of dead air between sheet 26 and the environment. Sheets 37 thus preferably have the same characteristics noted above as sheet 26. However, since sheets 37 are not subjected to a vacuum, flexibility is not particularly advantageous. Moreover, since the outermost sheet 37 is subject to winds and the like, it is desirable that at least the outermost one of sheets 37 be substantially rigid and inflexible. It is to be noted, though, that the same type of flexible membrane noted hereinabove as being suitable for sheet 26 can also advantageously be used for both sheets 37, provided that sheets 37 are secured to frame 22 under sufficient tension to render sheets 37 effectively rigid and inflexible. It is to be further noted in this regard that the use of "Tedlar" sheeting is especially preferred for sheets 37 because it has been found that "Tedlar" exhibits a heat shrinking tendency which causes sheets 37 made from "Tedlar" to become quite taut over a period of time as collector 20 is operated at normal elevated operating temperatures.

Preferably, the spacing between sheets 37 and between the inner sheet 37 and sheet 26 is minimized to limit convection air currents within regions 38. However, sufficient spacing preferably is provided to prevent contact between any of the sheets 26 and 37 due to gravity, wind and the like. When a membrane embodiment of sheets 37 made from "Tedlar" is employed, a spacing of one-half inch (1.27 cm) has proven advantageous in practice.

Heat transfer fluid 28 may be any fluid which is effectively transparent to solar IR radiation at a film thickness corresponding to the depth of channels 35, and which is a poor radiator, i.e., has a low reradiation factor, for long wave IR heat energy. In the experimental prototype of collector 20 described hereinabove, water has proven quite satisfactory as fluid 28, but various oils, such as mineral oil, aliphatic hydrocarbon oils, and particularly silicone oils are preferred since they provide substantially improved performance. The use of oils has the additional advantages of preventing permeation and clouding of sheet 26 and permitting operation of collector 20 at both higher and lower temperatures as desired.

Flow control module 27 advantageously comprises a conventional circulating pump 27A connected to a reservoir 27B of heat transfer fluid 28 and to conduits 29, a conventional vacuum source 27C connected to conduits 29, and conventional vacuum-responsive pressure switches, generally denoted 27D, connected so as to monitor the pressure in conduits 29 and so as to control the operation of pump 27A and source 27C. Conduits 29, frame 22, and pump 27A and reservoir 27B of control module 27 are connected so as to form a gastight closed loop from which air may be evacuated. Switches 27D are configured such that vacuum source 27C operates at any time the sensed relative pressure within the closed loop exceeds a predetermined maximum level corresponding to a desired level of relative vacuum, and such that circulating pump 27A operates only when the sensed relative pressure within the closed loop is below the aforesaid predetermined maximum value. Consequently, when flow control module 27 is initially actuated, vacuum source 27C initially operates to evacuate the system. Once the predetermined degree of relative vacuum has been attained, and sheet 26 has thus sealingly engaged absorber surface 30 to form passages 35, circulating pump 27A is actuated to begin circulating heat transfer fluid 28 through the system. Pump 27A thereafter operates continuously while collector 20 is collecting heat. Once pump 27A has commenced pumping, vacuum source 27C continues to operate until all of the air has been flushed from passages 35 and conduits 29 and they have become completely filled with fluid 28. Source 27C thereafter operates only when the relative pressure within the closed loop increases beyond the predetermined level due to the increased temperatures within the closed loop which are caused by operation of the collector, or when a leak develops. As will be appreciated by those of ordinary skill in the art, flow control module 27 advantageously also is provided with conventional thermally responsive control apparatus to control pump 27A in dependence on the temperature of fluid 28.

The pumping capacity of circulating pump 27A preferably is sufficient to create the desired flow rate through channels 35. Advantageously, the flow rate is maximized to obtain the minimum temperature differential across collector 20 consistent with the achievement of the highest overall energy efficiency of the system. In other words, the flow rate should not exceed the rate at which the marginal utility of an increased rate is not warranted because the power usage of the pump which would be necessary to obtain the increased flow rate would be disproportionate to the additional heat output which would be obtained as a result of the increased flow rate. In addition, as will be appreciated by those of ordinary skill in the art, a further practical limitation on achieving a preferred flow rate is the cost of the necessary pumps. However, it is to be noted that the provision of a convoluted absorber surface 30 and sealed channels 35 for fluid flow reduces the flow rates which are required to achieve satisfactory collector performance.

Advatageously, the pumping capacity of vacuum source 27C is sufficient to create a vacuum which minimizes the "boundary layer" effect which tends to occur when heat transfer fluid 28 is pumped through passages 35. As will be appreciated by those of ordinary skill in the art, the boundary layer effect causes some portion of fluid 28 in channels 35 to become stagnant and to remain in intimate contact with collector surface 30, such that the main body of fluid 28 flows over the boundary layer and absorbs heat therefrom rather than from the collector surface. Further, for use of collector 20 with tracker 40 to be described hereinbelow, the vacuum should be sufficient to allow tilting of collector 20 without affecting the flow rate.

As will be appreciated by those of ordinary skill in the art, the use of a vacuum has the further advantages of allowing operation of collector 20 at a location both above and below the location of pump 27A, minimizes the leakage of fluid 28 and facilitates detection of leaks, and allows sheet 26 to be made of a thin, flexible material which is highly transparent to shortwave IR radiation, light weight, and both sufficiently elastic to accommodate dimensional changes in the collector caused by diurnal temperature changes and sufficiently rigid when sealingly engaged with surface 30 of absorber 24 to allow heat transfer fluid 28 to be pumped through passages 35 at the desired flow rate without distortion of passages 35.

In the experimental prototype of collector 20 described hereinabove, a vacuum of eight inches (20.32 cm) of mercury, and a flow rate of two to three gallons per minute (7.6–11.4 liters per minute) through channels 35 has proven most satisfactory. The measured back pressure of the aforesaid experimental prototype of collector 20 is 7.3 feet (2.22 meters), and the aforementioned vacuum and flow rate parameters were obtained with an embodiment of pump 27A capable of pumping 320 gallons per hour (1211 liters per hour).

In addition, for use of collector 20 with tracker 40 described hereinbelow, collector 20 further comprises a conventional gravity-directed flow direction control circuit 39 mechanically linked to frame 22 and connected between pump 27 and pump conduits 29 to control the flow of fluid 28 through channels 35 such that fluid 28 always flows toward the upper end of surface 30.

Figure 7:
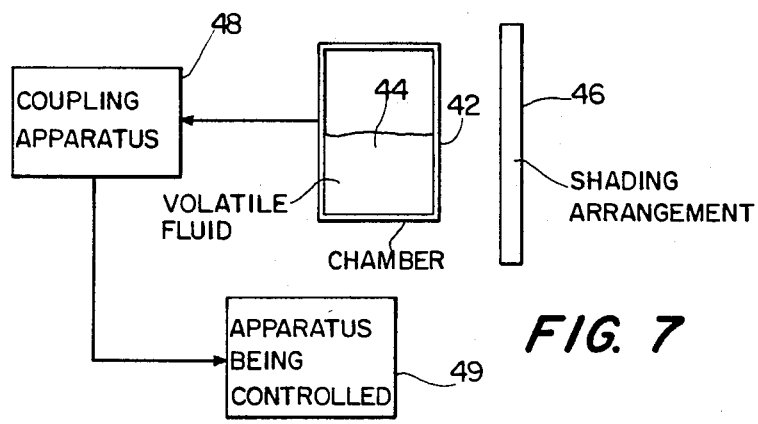
FIG. 7 is a schematic block diagram of a solar tracker constructed in accordance with the present invention.

Referring to FIG. 7, solar tracker 40 basically comprises at least one chamber 42 containing a volatile fluid 44, a shading arrangement, generally denoted 46, for controlling the degree to which the at least one chamber 42 is exposed to the sun in dependence on the position of the sun, and thereby controlling the extent to which fluid 44 is vaporized due to solar heating of the at least one chamber 42, and apparatus, generally denoted 48, for coupling the expansive force generated by vaporization of fluid 44 in the at least one chamber 42 to an object, apparatus or the like, generally denoted 49, to control the position, orientation, and/or operation thereof.

Referring to FIGS. 8–16, practical embodiments of solar tracker 40 will now be described which are adapted for use with collector 20 described hereinabove to maintain collector 20 at an optimum orientation with respect to the sun throughout the day for maximum solar energy collection.

The practical embodiments of tracker 40 generally comprise a base 50 for supporting collector 20, mounting apparatus, generally denoted 52, for pivotably mounting base 50 with respect to at least one pivot axis, a pair of tanks 54 for each pivot axis mounted to base 50, a conduit 56 for each pair of tanks 54 connecting the tanks together for the transfer of fluid therebetween, a shading arrangement, generally denoted 58, for each tank 54 for controlling the degree to which the associated tank 54 is exposed to the sun in dependence on the position of the sun, and a volatile fluid 71 disposed in each pair of tanks 54 for transfer therebetween.

Any conventional type of supporting apparatus which allows tanks 54 to be symmetrically mounted with respect to the at least one pivot axis in a counterbalancing relationship advantageously comprises base 50. When the preferred embodiments of collector 20 described hereinabove are mounted on solar tracker 40, collector frame 22 advantageously constitutes base 50.

Any conventional type of mounting apparatus can constitute mounting apparatus 52. Preferably, mounting apparatus 52 is configured such that a counteracting biasing force is produced when base 50 is pivoted so as to be inclined with respect to a predetermined equilibrium or stable position thereof, which biasing force acts to urge base 50 to return to the stable position. The biasing force advantageously is such that the magnitude thereof is proportional to the degree to which base 50 is pivoted from the stable position thereof.

A first preferred embodiment of mounted apparatus 52 is illustrated in FIGS. 8-11 which allows pivoting of base 50 with respect to a single pivot axis, and thus which is adapted for use with embodiments of tracker 40 utilizing a single pair of tanks 54. The first illustrated embodiment of apparatus 52 comprises a vertically oriented pedestal 51 mounted to the ground or other such support, a cross-bar or other platform 53 for supporting base 50 mounted to the distal end of pedestal 51, first and second toothed wheels 55 fixedly mounted by means of brackets 59 to base 50 in spaced relationship to each other and so as to define a north-south extending pivot axis 60, and first and second toothed tracks 57 which project from platform 53 in spaced relationship to each other so as to engage the corresponding wheels 55. Wheels 55 preferably are aligned with the center of gravity, or balance point, of base 50, as determined when base 50 is operatively loaded. Further, in order to provide the aforementioned biasing force, wheels 55 are mounted to base 50 such that pivot axis 60 is disposed relatively higher than the balance point of base 50. The vertical spacing between pivot axis 60 and the balance point of base 50 preferably is such that the equilibrium orientation of base 50 is a relatively horizontal orientation. A spacing of one-half inch (1.27 cm) has proved advantageous with the experimental prototype of collector 20 described hereinabove mounted on an embodiment of tracker 40 utilizing the tube embodiment of tanks 54 described hereinbelow.

Figure 9:
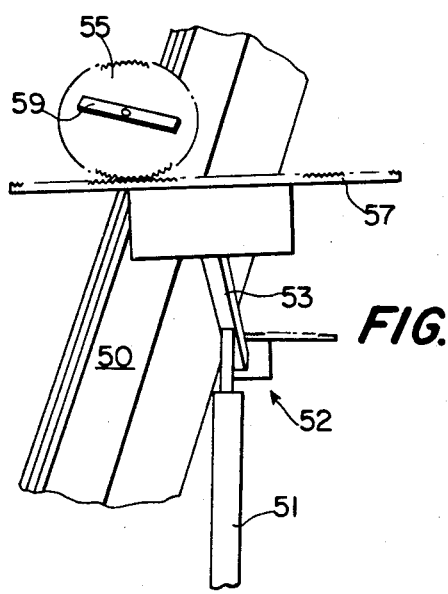
FIGS. 9-11 are bottom perspective views of a portion of the solar tracker shown in FIG. 7 showing three different orientations thereof.
Figure 10:
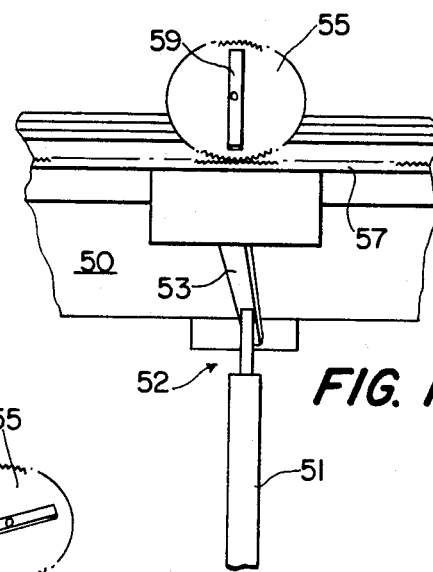
Figure 11:
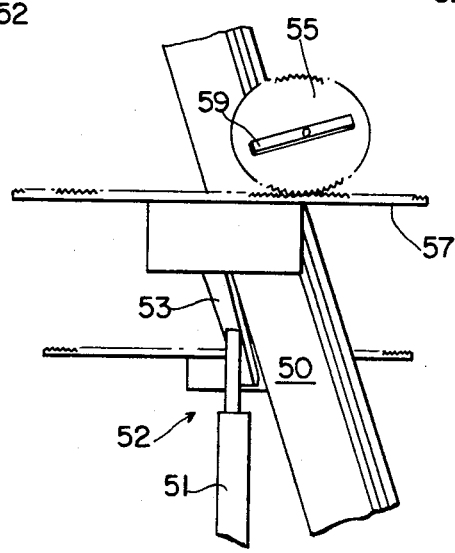

As shown in FIGS. 9-11, respectively, rotation of wheels 55 causes pivoting of base 50 with respect to axis 60 between an eastwardly-facing inclined position and a westwardly-facing inclined position. Rotation of wheels 55 further causes displacement thereof along tracks 57 such that platform 53 does not interfere with pivoting of base 50.

Figure 12:
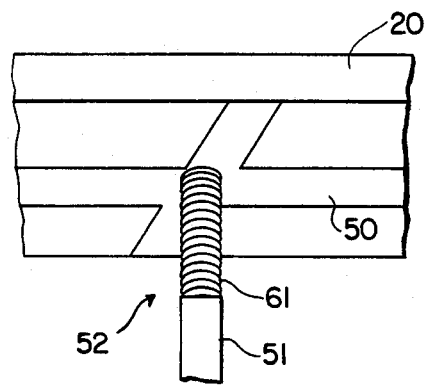
FIG. 12 is a diagrammatic bottom perspective view of a second embodiment of a solar tracker constructed in accordance with the present invention.
Figure 13:
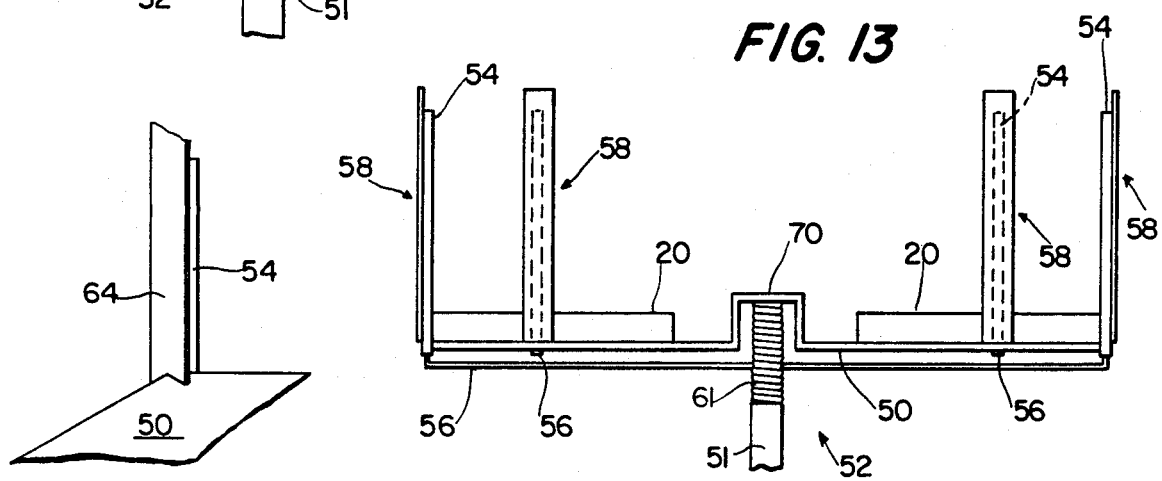
FIG. 13 is a diagrammatic side elevation view of a third embodiment of a solar tracker constructed in accordance with the present invention.

A second preferred embodiment of mounting apparatus 52 is illustrated in FIGS. 12 and 13 which allows pivoting of base 50 with respect to any pivot axis, and thus which is particularly adapted for use with embodiments of tracker 40 utilizing at least two pairs of tanks 54. The second illustrated embodiment of apparatus 52 simply comprises a vertically oriented coil compression spring 61, one end of which is mounted on pedestal 51 so as to be spaced from the ground or other such support, and the other end of which is mounted to base 50 coaxially with the balance point thereof. As will be appreciated by those of ordinary skill in the art, bending or flexing of spring 61 with respect to the longitudinal axis thereof produces the aforementioned biasing force which acts to urge tracker base 50 back from a relatively inclined position to the stable, relatively horizontal position thereof.

As shown in FIG. 13, base 50 advantageously is configured to support two collectors 20 which are symmetrically disposed on opposite (north and south) sides of an east-west extending pivot axis, and such that base 50 pivots about a point 70 which is spaced above the balance point of base 50 as determined when collectors 20 are loaded on base 50. As will be appreciated by those of ordinary skill in the art, the aforementioned biasing force is provided both by the action of spring 61 and the disposition of the pivot axis above the combined balance point.

A third preferred embodiment (not shown) of mounting apparatus 52 comprises conventional gimbals on which base 50 is suspended.

Each pair of tanks 54 is mounted to base 50 such that tanks 54 are symmetrically disposed on opposite sides of an imaginary plane defined by the associated pivot axis so as to be in counterbalancing relationship therewith. In the two tank embodiment of tracker 40 illustrated in FIG. 8, tanks 54 are mounted along an east-west axis of orientation for diurnal tracking of the sun. In the four tank embodiment of tracker 40 illustrated in FIGS. 13 and 16, one pair of tanks 54 is mounted along an east-west axis of orientation for diurnal tracking of the sun and the other pair of tanks 54 is mounted along a north-south axis of orientation for seasonal tracking of the sun. The degree to which tracker base 50 will tilt, with respect to a given pivot axis, is determined by the angle of inclination at which the differential torque applied thereto as a result of a transfer of fluid 71 between the corresponding tanks 54 is counterbalanced by the aforementioned biasing force which is produced. In order to accommodate the relatively greater degree of change in the diurnal position of the sun as compared to the seasonal position of the sun, the pair of tanks 54 having an east-west axis of orientation has a relatively greater amount of fluid 71 disposed therein and/or has a relatively greater spacing between the tanks 54, than does the pair of tanks 54 having a north-south axis of orientation. In both the two tank and the four tank embodiments of tracker 40, each pair of tanks 54 is disposed so as to be aligned with a point of support provided by mounting apparatus 52. Thus, in the two tank embodiment of FIG. 8, tanks 54 are aligned with toothed tracks 55 of mounting platform 53, and in the four tank embodiment of FIGS. 13 and 16, tanks 54 are aligned with the balance point of base 50.

Figure 16:
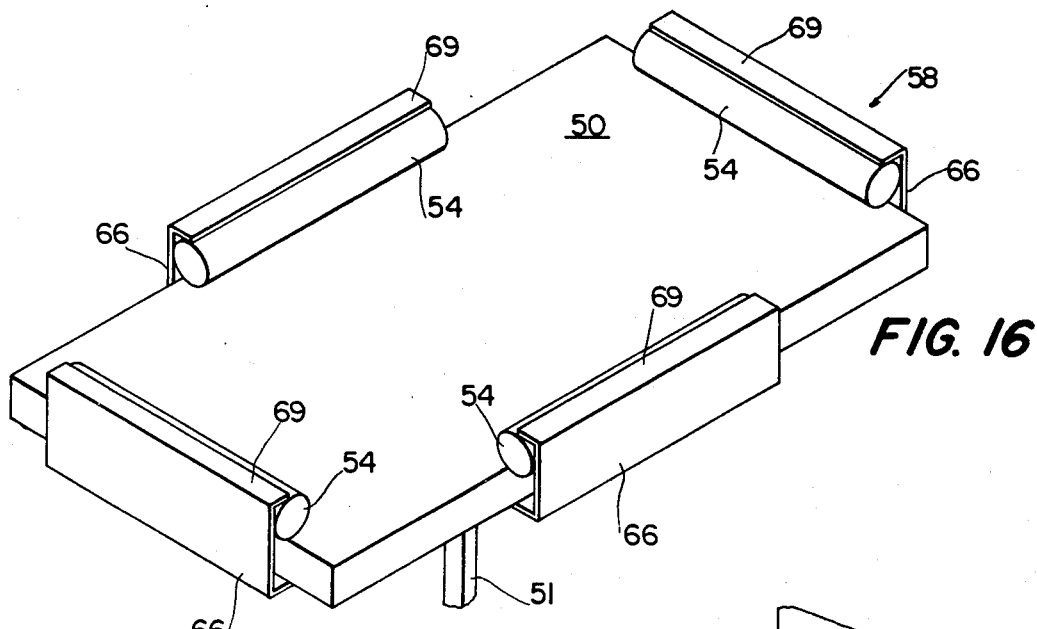
FIG. 16 is a top perspective view of still another embodiment of a solar tracker constructed in accordance with the present invention.

Tanks 54 may have any desired conventional configuration. Tanks 54 advantageously are configured in the form of relatively narrow diameter, elongate tubes which project vertically upward from tracker base 50, as shown in FIGS. 8, 13, 14, and 15, so as to maximize the torque differential which is produced by the shift of a given mass of fluid 71 between associated tanks 54. Tubular versions of tanks 54 four inches (10.2 cm) in diameter and four feet (1.2 m) in length have proven satisfactory with the practical embodiment of collector 20 described hereinabove. Alternatively, tanks 54 advantageously are configured in the form of relatively squat pods or the like which extend parallel to base 50, as shown in FIG. 16, so as to minimize the vertical profile, and hence the space requirements, of tracker 40.

Figure 8:
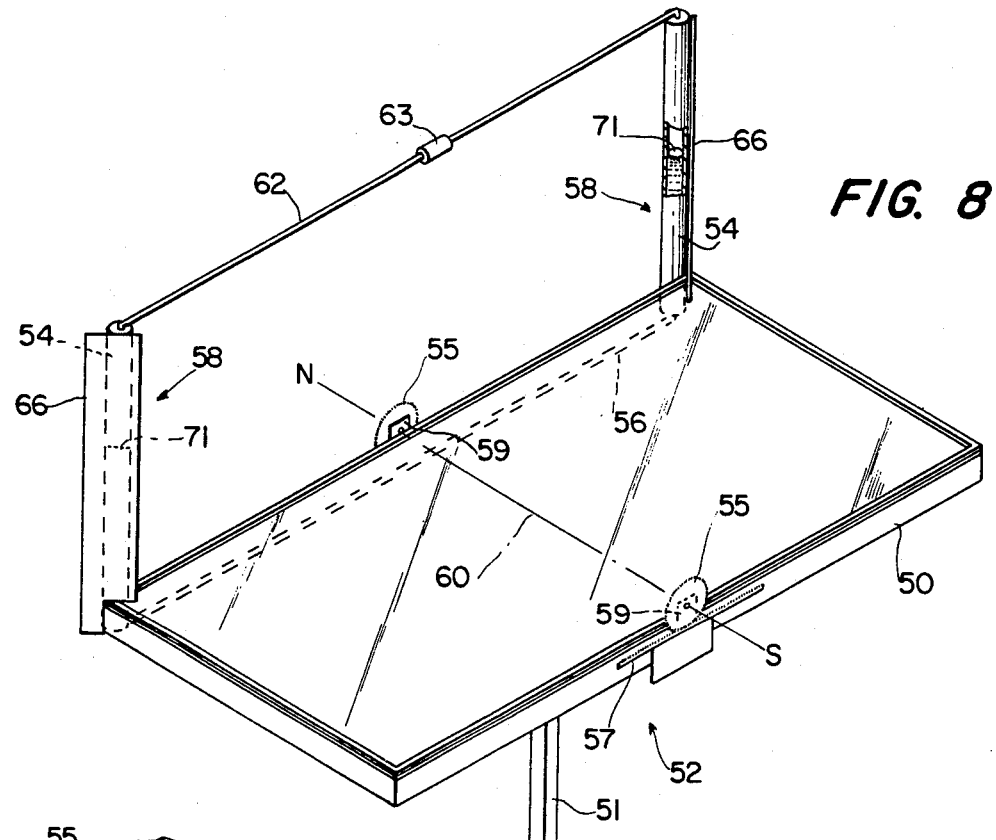
FIG. 8 is a diagrammatic top perspective view of a first embodiment of a solar tracker constructed in accordance with the present invention for use with the solar collector illustrated in FIGS. 2-6.

As shown in FIGS. 8 and 13, conduit 56 preferably is connected to the associated tanks 54, for example, at the bottoms thereof, so as to ensure that only fluid 71 in the liquid state thereof is transferred by conduit 56. Alternatively, conduit 56 communicates with fluid 71 in a tank 54 via a weighted inlet tube (not shown) which is mounted within the tank such that the distal end of the tube is displaced by the action of gravity to the lowermost point of the tank interior regardless of the tank's orientation. A further conduit 62 controlled by a valve 63 advantageously also is provided for each pair of tanks 54, as shown in FIG. 7, connecting the upper portions of associated tanks 54 so as to allow the gas pressure, and thus the levels of fluid 71, in tanks 54 to be initially equalized. After tanks 54 have been equalized, valve 63 is closed during operation of tracker 40 to prevent fluid transfer between the associated tanks 54 through conduit 62.

Each shading arrangement 58 is configured such that selected ones of tanks 54 are heated by the sun's radiation at different times during the day and a temperature imbalance is created between connected tanks which results in a transfer of fluid 71 therebetween, and hence a shift in the weight distribution of fluid 71 with respect to the corresponding pivot axis.

In order to maintain base 50 of the two tank embodiment of tracker 40 substantially orthogonal to, or in "high noon" relationship to the sun's radiation, tanks 54 are shaded by the corresponding shading arrangement 58 such that solar exposure of the east tank from the east and southeast, and solar exposure of the west tank from the west and southwest, are ineffective to heat the respective tanks. In order to maintain the four tank embodiment of tracker 40 properly aligned with respect to the sun, the corresponding shading arrangements 58 advantageously are configured to shade the east and west tanks 54 from eastern and western exposure, respectively, and the north and south tanks 54 from northern and southern exposure, respectively.

Figure 14:
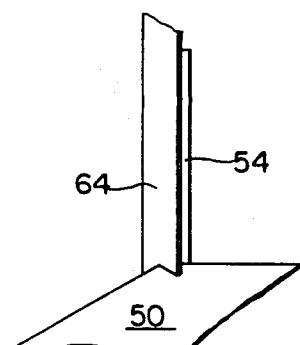
FIG. 14 is a diagrammatic top perspective view of a portion of a further embodiment of a solar tracker constructed in accordance with the present invention.

Each shading arrangement 58 advantageously comprises either a treated portion of the outer surface of the corresponding tank 54 which defines a relatively reflective region 64 thereon, as shown in FIG. 14, or a separate panel or screen 66 mounted adjacent the corresponding tank 54 by means of mounting brackets 67, as shown in FIGS. 8, 13, 15, and 16.

Figure 15:
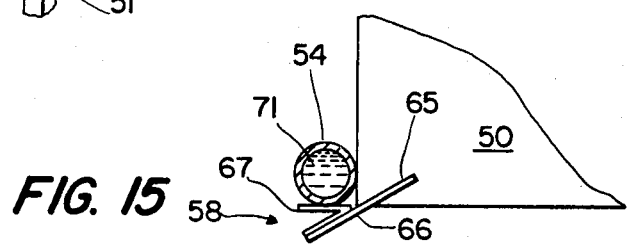
FIG. 15 is a top plan view of a portion of the solar tracker illustrated in FIG. 8.

As shown in FIGS. 8, 13, and 15, each screen 66 advantageously has a planar configuration and is mounted parallel to the longitudinal axis of the corresponding tank 54, and diagonally with respect to the corresponding axis of orientation. As shown in FIG. 16, each screen 66 preferably is also provided with a cap 69 or the like to shade the top or upwardly facing surface of the corresponding tanks 54 for use with embodiments of tank 54 having a substantial horizontally disposed top or upper surface in addition to vertically disposed surfaces, which upper surface would cause undesired heating of fluid 71 if it were exposed to the sun's radiation.

As will be apparent to those or ordinary skill in the art, the duration and timing of the shading provided by a screen 66 with respect to the transit of the sun is dependent on the angle of inclination of screen 66 with respect to the corresponding tank axis of orientation and the transverse or width dimension of screen 66. In the two tank embodiment of tracker 40, mounting screens 66 having a transverse dimension of ten inches (25.4 cm) at an angle of approximately 30° with respect to the east-west axis of orientation has proven advantageous with the tube embodiment of tanks 54 described hereinabove.

Preferably, when a screen embodiment of shading arrangement 58 is employed, the outer surfaces of tanks 54 are treated so as to be relatively absorptive of solar radiation, and the surface 65 of each screen 66 which faces the corresponding tank 54 is relatively reflective, such that when the sun is positioned for exposure of a tank 54, solar radiation is reflected from screen surface 64 onto the tank 54 to enhance the radiation incident thereon, and hence the degree to which the tank 54 is heated.

Volatile fluid 71 preferably has a high specific gravity and a low boiling point. Freon has proven advantageous. Preferably, tanks 54 are evacuated and a sufficient quantity of fluid 71 is introduced into each pair of tanks 54 so as to partially fill both tanks.

As will be appreciated by those of ordinary skill in the art, shading arrangements 58 permit selective exposure of tanks 54 to solar radiation in dependence on the position of the sun. Those tanks 54 which are exposed to the sun are heated, which causes at least some of the fluid 71 disposed in the tanks to vaporize. Uneven heating of connected tanks 54 creates a pressure unbalance therein which results in a displacement of unvaporized fluid 71 from the relatively hotter tank to the relatively cooler tank. The displaced fluid produces a weight imbalance which causes base 50 of tracker to tilt toward the sun such that the exposed surface thereof is more nearly perpendicular to the sun's radiation.

More specifically, referring to the two tank embodiment of tracker 40 illustrated in FIG. 8, the vapor pressure in tanks 54 is initially equalized in the manner described hereinabove by means of conduit 62 and valve 63 such that tracker base 50 is initially balanced in a horizontal position. As the sun rises, the east tank 54 is shaded and the west tank 54 is exposed to the sun's rays. As the west tank 54 is heated, some of the fluid 71 is displaced from the west tank 54 to the east tank 54, which causes tracker 40 to tilt such that base 50 is in an eastwardly facing inclined position facing the sun. As the sun continues to rise during the day, an increasing proportion of the east tank 54 is exposed to the sun's rays, causing a counterbalancing heating and vaporization process therein which causes a shift of fluid 71 back to the west tank 54, and a consequent tilting of tracker 40 back toward the horizontal as the sun rises to the noontime position thereof, and then toward a westwardly facing inclined position as the sun begins its descent to sunset.

The aforementioned fluid shifting process continues until sunset or until heavy clouds reduce the heating which occurs to the point where both tanks 54 are cooled to substantially the same temperature. As a temperature equilibrium is reached, the partial vacuum in tanks 54 causes fluid 71, substantially all of which is preferably then in a liquid state, to seek equilibrium levels in tanks 54. The resulting weight shift with respect to the corresponding pivot axis, plus the biasing force described hereinabove which is produced when base 50 is in a non-horizontal position, cause tracker 40 to return to a leveled position. A similar process occurs with respect to each pivot axis in the four tank embodiment of tracker 40 illustrated in FIGS. 13 and 16.

Figure 18:
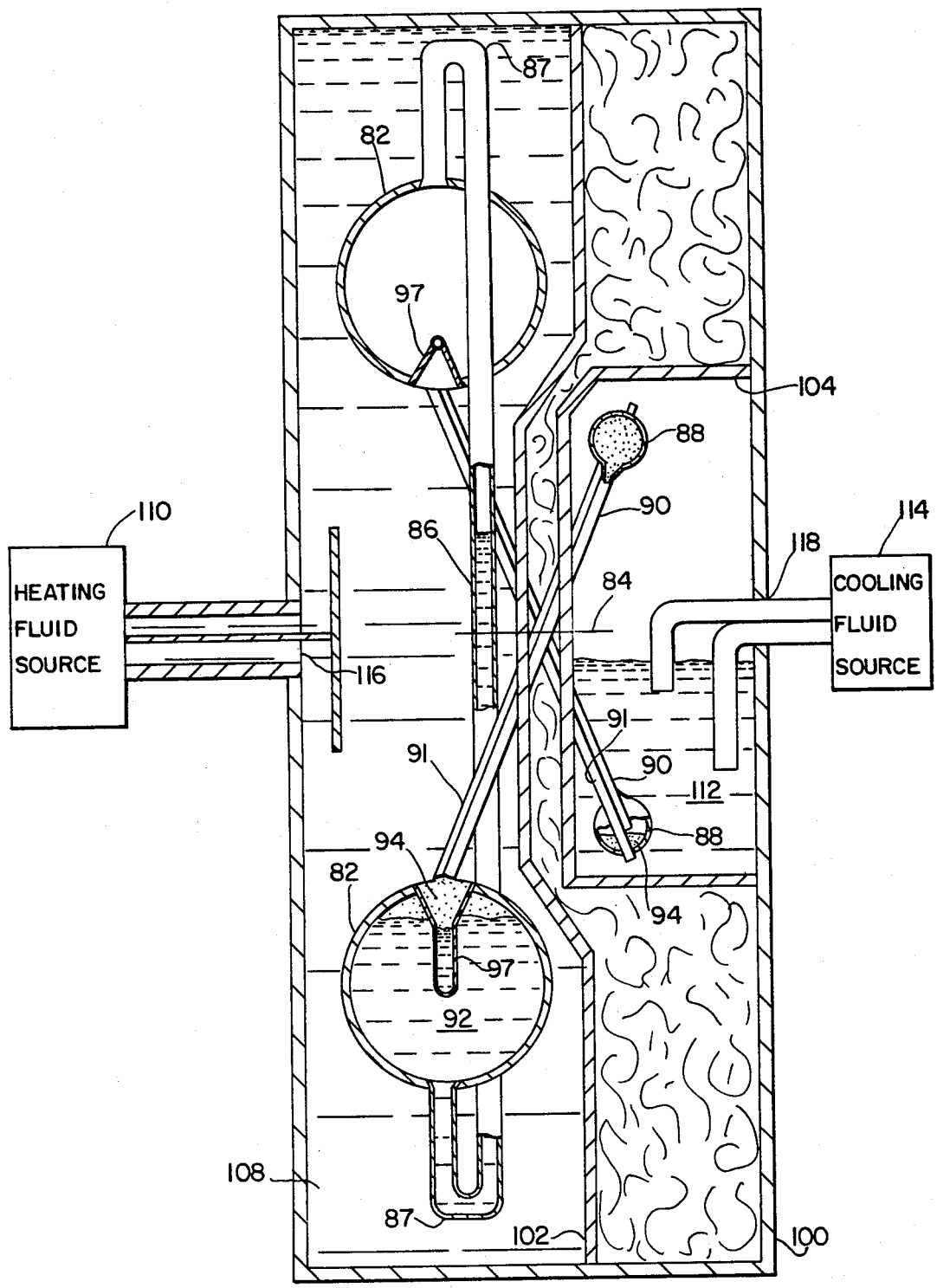
FIG. 18 is a diagrammatic end elevation view, selectively cut away, of a modified two tank embodiment of the heat engine shown in FIG. 17 which includes a combined heating and cooling system adapted for use with heat energy supplied by a solar collector.

Referring to FIGS. 17 and 18, heat engine 80 comprises at least one pair of opposed tanks 82 radially mounted for rotation about an axis of rotation 84, a conduit 86 for each pair of tanks 82 connecting the tanks together for transfer of fluid therebetween, a condensation chamber 88 for each tank 82, a conduit 90 connecting each condensation chamber 88 to the corresponding tank 82 for transfer of fluid therebetween, a relatively heavy fluid 92 disposed for transfer between connected tanks 82, a relatively volatile fluid 94 disposed for transfer from each condensation chamber 88 to the corresponding tank 82, a heating arrangement or system, generally denoted 96, for heating heavy fluid 92, and a cooling arrangement or system, generally denoted 98, for cooling condensation chambers 88.

As shown, preferably at least two pairs of opposed tanks 82 are provided, with each pair equally spaced from the adjacent pairs. Condensation chambers 88 are preferably disposed symmetrically with respect to each other and such that each chamber 88 is diammetrically opposed to the tank 82 to which it is connected and adjacent the tank 82 opposing the tank 82 to which it is connected. As shown, conduits 86 preferably are configured so as to form loop-type traps 87 which are tangentially connected to the corresponding tanks 82 such that each trap 87 is disposed relatively below the associated tank 82 when the tank is disposed in the lowermost position thereof. Conduits 86 and tanks 82 preferably are also connected such that opposing tanks 82 are on the opposite sides of an imaginary plane defined by the connecting conduit 86 and adjacent tanks 82 are separated by an imaginary plane defined by one of the associated conduits 86. Thus, as a pair of tanks 82 rotates about axis 84, each tank 82 will reach and have passed through the uppermost vertical position thereof slightly before the associated conduit 86 reaches the vertical position thereof. The direction of rotation of tanks 82, and hence of engine 80 when operating, is thus determined by the location of tanks 82 relative to connecting conduits 86. In particular, engine 80 will rotate in the direction in which the upper tank 82 of an opposing pair will fall downward due to gravity when the connecting conduit 86 is vertically oriented. For example, the embodiment of engine 80 illustrated in FIG. 17 rotates clockwise as viewed from the perspective of FIG. 17.

Each conduit 90 is joined to the associated chamber 88 such that fluid 94 is transferred from the chamber 88 to the associated tank 82 such that vaporization of fluid 94 occurs at a predetermined point during the cycle of operation of engine 80 which corresponds to a predetermined position of tanks 82. Preferably, vaporization occurs in each tank 82 when the tank is in the lowermost position thereof. As will be appreciated by those of ordinary skill in the art, in order to compensate for the finite time required for fluid 94 to traverse a conduit 90, each conduit 90 advantageously is joined to the associated chamber 88 such that fluid 94 actually begins to flow in conduit 90 slightly before the associated tank 82 reaches the aforesaid predetermined position thereof. Further, each conduit 90 also is preferably configured such that the end which is joined to the associated chamber 88 is sigmoid, as shown, or otherwise bent so as to form a siphon 93 which causes fluid 94 to siphon abruptly between chambers 88 and the associated tanks 82. As is also shown, a further conduit 91 advantageously is provided which is connected between each chamber 88 and the associated tank 82 so as to function as a vent line which facilitates siphoning of fluid 94 from chambers 88.

Each conduit 90 also is preferably joined to the associated tank 82 such that vaporization of fluid 94 occurs within the tank at a location which then constitutes the uppermost region thereof. Each conduit 90 further preferably communicates with the interior of the associated tank 82 via a valve arrangement, generally denoted 95, which prevents fluid 92 from entering conduit 90 and the associated chamber 88 when the conduit inlet to chamber 88 is relatively lower than the conduit inlet to the associated tank 82 and during the condensing cycle of chamber 88 when fluid 94 is being sucked out of tank 82 by the condensation process, but which allows fluid 94 to contact fluid 92 for vaporization of fluid 94.

A preferred embodiment of valve arrangement 95 is illustrated which does not employ any moving parts, and comprises a further conduit 97 disposed within the associated tank 82. One end of conduit 97 communicates with the associated conduit 90, and the other, distal, end is disclosed in a location which constitutes the uppermost region of the interior of the associated tank 82 when the tank is in the position during the rotation cycle therefor at which the tank becomes maximally filled with fluid 92. Preferably, the end of conduit 97 communicating with the associated conduit 90 is enlarged, as shown, so as to maximize the surface area of fluid 92 which fluid 94 initially contacts, and thereby facilitate flash vaporization of fluid 94, but without unduly restricting the volume of fluid 92 which can be contained within tanks 82. Further, the interior wall of each tank 82 is formed with a recess 99 in which the distal end of conduit 97 is disposed such that the maximum amount of fluid 94 is removed from each tank 82 back to the associated chamber 88 as the tank 82 is filled with fluid 92 and fluid 94 is condensed in the associated chamber 88.

Tanks 82 may have any desired configuration. Chambers 88 advantageously are configured in a conventional manner to facilitate cooling, and hence condensation, of volatile fluid 94, and such that the volatile fluid 94 for a chamber approximately half fills the chamber when the fluid 94 is in the liquid or condensed state thereof. When the preferred embodiment of cooling arrangement 98 to be described hereinbelow is used, chambers 88 advantageously also are streamlined so as to minimize hydrodynamic drag.

A quantity of heavy fluid 92 is introduced into each pair of tanks 82 which is sufficient to completely fill one of the tanks and enough of the associated trap 87 to ensure that none of the volatile fluid 94 for a particular chamber 88 can pass from the associated tank 82 to the opposing tank 82 as heavy fluid is transferred from one tank to the other. The unfilled tank 82 of each pair of tanks, and the unfilled portion of the connecting conduit 86, are preferably evacuated to minimize the resistance to fluid transfer from one tank to the other.

Fluids which have a relatively high specific gravity are preferred for heavy fluid 92 to minimize the amount of fluid and the spacing of tanks 82 from axis 84 which are required to generate a desired level of torque. It is also desirable that fluid 92 have a low vapor pressure to minimize the possibility that fluid 92 will collect in chambers 88 through condensation, and that fluid 92 be chemically compatible with volatile fluid 94 at the operating temperatures to which fluid 92 is heated. Mercury is suitable except in applications where the high cost and/or toxicity thereof preclude its use. Metals or metal alloys, such as Wood's alloy, which have a low melting temperature, are also preferred when heating system 96 utilizes collector 20 described hereinabove.

Condensation chambers 88 are partially filled with volatile fluid 94. Fluids having a low vaporization temperature and a high expansion rate are preferred for fluid 94. In an embodiment of heat engine 80 using Wood's alloy as heavy fluid 92, a formulation of Freon, such as Freon 11, which is adapted to the temperature range necessary to maintain the Wood's alloy in a molten state has proven satisfactory as volatile fluid 94. The relative quantities of heavy fluid 92 and volatile fluid 94 to be used are determined by the distance between opposed tanks 82, the specific gravity of fluid 92, the expansion ratio of fluid 94, and the temperature to which fluid 94 is heated in the gaseous phase thereof. Two grams of Freon subjected to temperatures of approximately 180° F. (82.2° C.) have proven sufficient to displace 150 pounds (68.04 kilograms) of Wood's alloy between tanks 82 which are spaced 22 feet (6.7 meters) apart.

Any conventional heating and cooling arrangements advantageously constitute heating and cooling systems 96 and 98, respectively. Heating system 96 advantageously is adapted to maintain heavy fluid 92 at a relatively constant elevated temperature, and cooling system 98 advantageously is adapted to intermittently cool each condensation chamber 88 during a predetermined portion of the operating cycle of heat engine 80, as will be described in more detail hereinbelow.

Combined apparatus constituting systems 96 and 98 is illustrated in FIG. 18, and comprises a housing 100 in which tanks 82, chambers 88, and conduits 86 and 90 are disposed. Advantageously, tanks 82 and chambers 88 are fixedly mounted to housing 100 and housing 100 is mounted for rotation about axis 84. As shown, tanks 82 are spaced from chambers 88 longitudinally with respect to axis 84, and housing 100 is configured to define a first jacket 102 enclosing tanks 82 and conduits 86, and a second jacket 104, preferably spaced from jacket 102 and thermally isolated therefrom by insulation 106, enclosing chambers 88. A heating fluid 108 is supplied to jacket 102 from a source 110 and a cooling fluid 112 is supplied to jacket 104 from a source 114 through axial openings 116 and 118, respectively, formed in opposite sides of housing 100. Preferably, jacket 102 is maintained completely filled with heating fluid 108, such that tanks 82 are completely immersed in a bath of heating fluid, while jacket 104 is maintained only partially filled, such that chambers 88 pass into and out of a bath of cooling fluid 112 as they rotate about axis 84. The level of cooling fluid 112 in jacket 104 is preferably below the axis of rotation 84, such that each tank 82 has passed the midpoint of its downward displacement before the associated chamber 88 enters fluid 112. As will be appreciated by those of ordinary skill in the art, the relative level of fluid 112 is determined in dependence on the temperature differential between heavy fluid 92 and cooling fluid 112, the rotational speed of engine 80, and the transfer time required for passage of a given volume of fluid 92 between associated tanks 82.

Advantageously, heated water or oil, or the like, constitutes heating fluid 108, and collector 20 described hereinabove constitutes source 110. Any conventional refrigerant, including relatively cool water, advantageously constitutes cooling fluid 112. The greater is the difference in temperature between heating fluid 108 and cooling fluid 112, the faster tends to be the speed of rotation of tanks 82 about axis 84.

The operation of heat engine 80 will now be described with reference to the four tank embodiment shown in FIG. 17. For convenience, tanks 82 have been lettered A, B, C, and D, and the corresponding expansion chambers 88 have been designated a, b, c, and d.

As noted hereinabove, tanks 82 rotate clockwise about axis 84 when viewed from the perspective of FIG. 17. Tanks 82 become filled with heavy fluid 92 as they rotate through the half cycle wherein they are descending with respect to the vertical, and are emptied as they rotate through the half cycle wherein they are ascending with respect to the vertical. Opposing tanks 82 are filled and emptied 180° out of phase with each other as the heavy fluid 92 contained therein is transferred back and forth between the tanks. Transfer of fluid 92 commences when a filled tank 82, for example, tank A in FIG. 17, reaches the lowermost position thereof and volatile fluid 94 is a condensed state travels from the associated condensation chamber "a" through conduit 90 and contacts fluid 92. Since fluid 92 is heated, fluid 94 effectively "flash" vaporizes, and the resulting gaseous expansion acts directly on fluid 92 to force it upwardly from tank A through the connecting conduit 86 to emptied tank B. The weight of heavy fluid 92 in tank B provides the impetus or momentum for displacement of tank B from the uppermost position thereof downwardly through the cycle of rotation toward the vertically lowermost position thereof. Maximum efficiency is obtained from the expansion energy of fluid 94 because as tank A empties and tank B fills, a constantly decreasing quantity of fluid 92 need be displaced a constantly decreasing vertical distance.

Preferably, transfer of fluid 92 from tank A to tank B is substantially completed by the time tanks A and B have reached the midpoints of their respective vertical displacements. At this stage, the condensing cycle for the vaporized fluid 94 from condensation chamber "a" commences. With the preferred embodiment of cooling system 98 illustrated in FIG. 18 and described hereinabove, synchronization of the condensing cycle is achieved automatically because, as tank B passes the midpoint of its downward displacement, chamber "a" enters cooling fluid 112 and is cooled thereby, thus inducing condensation of fluid 94 in chamber "a". In addition, as chamber "a" becomes relatively lower vertically than tank A, additional fluid 94 is induced by gravity to travel toward chamber "a", where it is condensed. Condensation of fluid 94 in chamber "a" continues as chamber "a" continues its arc of travel through cooling fluid 112, and the now emptied tank A travels upwardly to the vertically highest position thereof.

When tank A reaches the vertically highest position thereof, transfer of fluid 92 thereto from the now filled tank B commences in the same manner as that described above when tank B was in the vertically highest position thereof. Condensation of fluid 94 preferably ceases as tank A rotates downwardly to the midpoint of its vertical displacement. This is achieved automatically with the embodiment of cooling system 98 shown in FIG. 18 and described hereinabove because by the time tank A reaches the midpoint of its downward displacement, chamber "a" has emerged from cooling fluid 112. As will be appreciated by those of ordinary skill in the art, cessation of the cooling of chamber "a" for a period of time prior to the vaporization of fluid 94 minimizes the degree to which fluid 94 prematurely condenses in chamber "a" during the vaporization phase, and thus maximizes the expansion energy which is available for displacement of fluid 92. The identical cycle is followed in the case of tanks C and D.

As will be appreciated by those of ordinary skill in the art, the rate of exchange, or cycle time for fluid 94 to expand and condense determines the speed of rotation of tanks 82 about axis 84. The specific gravity of fluid 92 and the distance it travels during the displacement of a tank 82 from the uppermost position thereof to the lowermost position thereof determines the foot-pounds of torque production, which can be readily converted into various other forms of mechanical or electrical energy, as is well known in the art.

Although the invention has been described with respect to exemplary embodiments thereof, it will be understood that variations and modifications can be effected in the embodiments without departing from the scope or spirit of the invention.

I claim:

1. Solar tracking apparatus comprising
at least one chamber containing a volatile fluid,
a base on which said at least one chamber is mounted,
mounting means for pivotably mounting said base with respect to a pivot axis,
shading means for controlling the degree to which said at least one chamber is exposed to the sun in dependence on the position of the sun so as to control the extent to which said fluid is vaporized due to solar heating of said at least one chamber and to thereby control pivoting of said base relative to said pivot axis, and
means for coupling the expansive force generated by vaporization of said fluid to a work piece to control the position, orientation, and/or operation thereof,
said mounting means comprising a single coil spring which is mounted to and directly and pivotally supports the weight of said base so as to enable pivoting of said base, and which further provides a bias force, when said base is pivoted with respect to a predetermined position thereof, such as to urge said base to return to said predetermined position.

2. Solar tracking apparatus comprising
a base,
mounting means for pivotably mounting said base with respect to a pivot axis,
first and second chambers mounted to said base in counterbalancing relationship with respect to said pivot axis,
conduit means connected to said first and second chambers for transfer of fluid therebetween,
a volatile fluid disposed in said chambers for transfer therebetween, and
shading means for controlling the degree to which each of said chambers is exposed to the sun such that a differential vapor pressure is created between said chambers, in dependence on the position of the sun, which causes a predetermined transfer of said fluid between said chambers so as to change the proportion of said fluid disposed within each of said chambers and thereby cause said base to pivot into a predetermined orientation with respect to the position of the sun,
said mounting means comprising a single coil spring which is mounted to and directly supports the weight of said base while enabling pivoting of said base, and which further provides a bias force, when said base is pivoted with respect to a predetermined position thereof, such as to urge said base to return to said predetermined position.

3. The solar tracking apparatus of claim 2 wherein said chambers comprise elongate tubular members mounted to said base such that the longitudinal axes of said tubular members are substantially perpendicular to an imaginary axis connecting said tubular members and passing through said pivot axis.

4. The solar tracking apparatus of claim 2 wherein said shading means comprises selected portions of the outer surfaces of said chambers which are treated so as to be relatively reflective of solar radiation.

5. The solar tracking apparatus of claim 2 wherein said shading means comprises a screen mounted in shielding relationship to each of said chambers.

6. The solar tracking apparatus of claim 2 wherein said chambers are aligned with an east-west extending orientation axis and said first and second chambers are disposed to the east and west, respectively, of said pivot axis, and said shading means comprises means for shading said first chamber from exposure to the sun from the east and southeast, and means for shading said second chamber from exposure to the sun from the west and southwest.

7. The solar tracking apparatus of claim 2 wherein said coil spring supports said base such that the balance point thereof is disposed relatively lower than said pivot axis.

8. The solar tracking apparatus of claim 2 wherein said chambers are partially evacuated such that said volatile fluid assumes an equilibrium distribution within said chambers in the absence of sufficient solar heating to vaporize said volatile fluid.

* * * * *